US009387629B2

(12) United States Patent
Pearson et al.

(10) Patent No.: US 9,387,629 B2
(45) Date of Patent: Jul. 12, 2016

(54) COMPOSITE HAT STIFFENER, COMPOSITE HAT-STIFFENED PRESSURE WEBS, AND METHODS OF MAKING THE SAME

(71) Applicant: The Boeing Company, Chicago, IL (US)

(72) Inventors: Steven E. Pearson, Lynnwood, WA (US); Matthew M. Whitmer, Seattle, WA (US); Rebecca M. Dixon, Wilmington, DE (US); Jason L. Firko, Wilmington, DE (US); Douglas G. Marciniak, Lake Stevens, WA (US); Kenneth D. Cominsky, Mukilteo, WA (US); Martin G. Andrews, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 14/312,401

(22) Filed: Jun. 23, 2014

(65) Prior Publication Data
US 2014/0299257 A1 Oct. 9, 2014

Related U.S. Application Data

(63) Continuation of application No. 13/531,583, filed on Jun. 24, 2012, now Pat. No. 8,758,879.

(51) Int. Cl.
*B21D 53/92* (2006.01)
*B29C 70/46* (2006.01)
(Continued)

(52) U.S. Cl.
CPC ............ *B29C 70/462* (2013.01); *B29C 70/545* (2013.01); *B29C 70/865* (2013.01);
(Continued)

(58) Field of Classification Search
CPC .......... B64C 3/26; B64C 1/064; B64C 3/182; B64C 2001/0072
USPC ......................................................... 156/307
See application file for complete search history.

(56) References Cited

U.S. PATENT DOCUMENTS 3,995,081 A 11/1976 Fant et al.
5,271,986 A * 12/1993 Dublinski ............ B29C 33/307
428/156

(Continued)

FOREIGN PATENT DOCUMENTS

DE 102009047340 A1 6/2011
EP 2336021 A2 6/2011
(Continued)

OTHER PUBLICATIONS

Extended European Search Report from European Patent Office for Counterpart Application No. EP13171489.1, Dated Oct. 22, 2013, Applicant The Boeing Company, 7 pages.
(Continued)

*Primary Examiner* — Scott W Dodds

(57) ABSTRACT

There is provided a method of making a composite hat stiffener. The method has the steps of curing a composite hat stiffener in a hat tool to form a pre-cured composite hat stiffener. The pre-cured composite hat stiffener has a composite hat section, a plurality of composite stiffening plies with a body ply, a wrap ply, and a base ply, all coupled to the composite hat section, wherein the body ply is coupled to a first side of the composite hat section, the wrap ply is coupled to the body ply, and the base ply is coupled to the body ply and the wrap ply, a pair of radius filler noodles coupled to the composite hat section and disposed between the plurality of composite stiffening plies, and an outer ply coupled to the composite hat section. The method further includes bonding the pre-cured composite hat stiffener to a structure surface.

20 Claims, 9 Drawing Sheets

(51) Int. Cl.
*B29C 70/86* (2006.01)
*B29D 99/00* (2010.01)
*B64C 1/06* (2006.01)
*B64C 1/10* (2006.01)
*B29C 70/54* (2006.01)
*B64C 3/26* (2006.01)
*B64C 1/00* (2006.01)

(52) U.S. Cl.
CPC ............ *B29D99/0003* (2013.01); *B64C 1/064* (2013.01); *B64C 1/10* (2013.01); *B64C 3/26* (2013.01); *B64C 2001/0072* (2013.01); *Y02T 50/433* (2013.01); *Y10T 156/1028* (2015.01); *Y10T 428/24488* (2015.01); *Y10T 428/24628* (2015.01)

(56) References Cited

U.S. PATENT DOCUMENTS

| | | | |
|---|---|---|---|
| 5,893,534 | A | 4/1999 | Watanabe |
| 6,562,436 | B2 | 5/2003 | George et al. |
| 6,689,448 | B2 | 2/2004 | George et al. |
| 6,735,866 | B2 | 5/2004 | Nogueroles Vines et al. |
| 6,849,150 | B1 | 2/2005 | Schmidt |
| 6,964,723 | B2 | 11/2005 | Lindsay et al. |
| 2007/0144653 | A1 | 6/2007 | Padilla et al. |
| 2008/0066983 | A1 | 3/2008 | Kimoto et al. |
| 2008/0111024 | A1* | 5/2008 | Lee .................. B64C 1/068 244/121 |
| 2010/0139857 | A1 | 6/2010 | Pham et al. |
| 2010/0304094 | A1 | 12/2010 | Brook et al. |
| 2010/0320320 | A1 | 12/2010 | Kismarton |
| 2011/0139932 | A1 | 6/2011 | Matheson et al. |
| 2012/0045609 | A1 | 2/2012 | Brook et al. |

FOREIGN PATENT DOCUMENTS

EP 2455213 A2 5/2012
WO 2009140555 A2 11/2009

OTHER PUBLICATIONS

State Intellectual Property Office (SIPO) of the P.R.C., Notification of First Office Action and Search Report, Issued Mar. 2, 2016, for related Chinese Application No. 201310251520.5, The Boeing Company, 21 pages.

Canadian Intellectual Property Office (CIPO), Notification of Office Action and Examination Search Report, Issued May 12, 2106, for related Canadian Application No. 2,815,523, Owner The Boeing Company, 4 pages.

* cited by examiner

COMPOSITE HAT STIFFENER, COMPOSITE HAT-STIFFENED PRESSURE WEBS, AND METHODS OF MAKING THE SAME

CROSS-REFERENCE TO RELATED APPLICATIONS

The present application is a continuation of and claims priority to pending application Ser. No. 13/531,583, filed Jun. 24, 2012, and entitled COMPOSITE HAT STIFFENER, COMPOSITE HAT-STIFFENED PRESSURE WEBS, AND METHODS OF MAKING THE SAME, the entire contents of which is incorporated herein by reference.

BACKGROUND

1) Field of the Disclosure

The disclosure relates generally to composite reinforcing support structures, and more specifically, to composite hat stiffener configurations and methods used in forming composite hat-stiffened pressure webs, such as for use in aircraft.

2) Description of Related Art

Composite structures are used in a wide variety of applications. In aircraft construction, composites are used in increasing quantities to form the fuselage, wings, tail section and other components. For example, aircraft fuselage structures, such as bulkheads and pressure decks, may be formed of composite stiffened panel structures comprising composite pressure web or skin panels to which reinforcing stiffeners may be attached or bonded to improve the strength, stiffness, buckling resistance, and stability of the composite pressure web or skin panels. The reinforcing stiffeners attached or bonded to the composite pressure web or skin panels may be configured to carry various loads.

Known reinforcing stiffeners used with such composite pressure web or skin panels may include I-beam stiffeners (a beam with an I-shaped cross-section). However, known I-beam stiffened composite panels reinforced with such known I-beam stiffeners may experience high pull-off loads at the radius filler, i.e., "noodle", portions of the I-beam stiffener or at the radius common to the attached flange of the reinforcing stiffener in the region of the noodle. As used herein, "pull-off load" means a shear load and/or moment force applied to a composite component part, such as a reinforcing stiffener, at locations where the composite component part is attached or bonded to a structure, such as a composite pressure web or skin panel, such that the shear load and/or moment force may cause delamination or separation of the reinforcing stiffener from the attached structure. As used herein, "radius filler noodle" means a composite material or adhesive/epoxy material having a triangular cross-section that is used to fill a gap left by the radius of curved pieces of a composite component part, such as a reinforcing stiffener.

To decrease the likelihood of delamination or separation of the I-beam stiffener from the composite pressure web or skin panel due to high pull-off loads, numerous additional radius filler elements, fasteners, and/or angle fittings may be required at the locations or joints where the I-beam stiffener is attached or bonded to the composite pressure web or skin panel. Such radius filler elements, fasteners, and/or angle fittings may provide additional structural reinforcement to the locations or joints and distribute the shear load and/or moment force in order to reduce the risk of delamination at the radius filler or noodle portions of the I-beam stiffener.

However, the use of such numerous additional radius filler elements, fasteners, and/or angle fittings may result in increased production time, increased part count and expense, increased labor and manufacturing costs to install and maintain the parts, and an overall increase in the complexity of the structure. Moreover, the use of fasteners or angle fittings that require mechanical fastening to the reinforcing stiffener or composite pressure web or skin panel may require the formation of appropriately-sized holes in the composite material or structure. This, in turn, may require the use of specialized tooling to form such holes in the composite material or structures. Such specialized tooling may result in further increased labor and manufacturing costs.

Accordingly, there is a need in the art for an improved composite stiffener and improved composite stiffened structures and methods of making the same that provide advantages over known configurations, structures and methods.

SUMMARY

This need for an improved composite stiffener and improved composite stiffened structures and methods of making the same is satisfied. As discussed in the below detailed description, embodiments of an improved composite hat stiffener and an improved composite hat-stiffened structure and method of making the same may provide significant advantages over known configurations, structures and methods.

In an embodiment of the disclosure, there is provided a composite hat stiffener. The composite hat stiffener comprises a composite hat section having a first side and a second side. The composite hat stiffener further comprises a plurality of composite stiffening plies coupled to the composite hat section. The plurality of composite stiffening plies comprises a body ply coupled to the first side of the composite hat section, a wrap ply coupled to the body ply, and a base ply coupled to the body ply and the wrap ply. The composite hat stiffener further comprises a pair of radius filler noodles coupled to the composite hat section and disposed between the plurality of composite stiffening plies. The composite hat stiffener further comprises an outer ply coupled to the second side of the composite hat section.

In another embodiment of the disclosure, there is provided a composite hat-stiffened pressure web. The composite hat-stiffened pressure web comprises an uncured composite pressure web. The composite hat-stiffened pressure web further comprises a composite hat stiffener bonded to the uncured composite pressure web. The composite hat stiffener is pre-cured and comprises a composite hat section having a first side and a second side. The composite hat stiffener further comprises a plurality of composite stiffening plies coupled to the composite hat section. The plurality of composite stiffening plies comprises a body ply coupled to the first side of the composite hat section, a wrap ply coupled to the body ply, and a base ply coupled to the body ply and the wrap ply. The composite hat stiffener further comprises a pair of radius filler noodles coupled to the composite hat section and disposed between the plurality of composite stiffening plies. The composite hat stiffener further comprises an outer ply coupled to the second side of the composite hat section.

In another embodiment of the disclosure, there is provided a method of making a composite hat-stiffened pressure web to reduce effects of pull-off load and to improve stability of a pressure web. The method comprises curing a composite hat stiffener in a hat tool to form a pre-cured composite hat stiffener. The pre-cured composite hat stiffener comprises a composite hat section. The pre-cured composite hat stiffener further comprises a plurality of composite stiffening plies comprising a body ply, a wrap ply, and a base ply, all coupled to the composite hat section. The pre-cured composite hat stiffener further comprises a pair of radius filler noodles coupled to the composite hat section and disposed between the plurality of composite stiffening plies. The pre-cured composite hat stiffener further comprises an outer ply coupled to the composite hat section. The method further comprises bonding the pre-cured composite hat stiffener to an uncured composite pressure web to form a composite hat-stiffened pressure web. The composite hat-stiffened pressure web minimizes a pull-off load at the radius filler noodle and improves stability of a pressure web.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
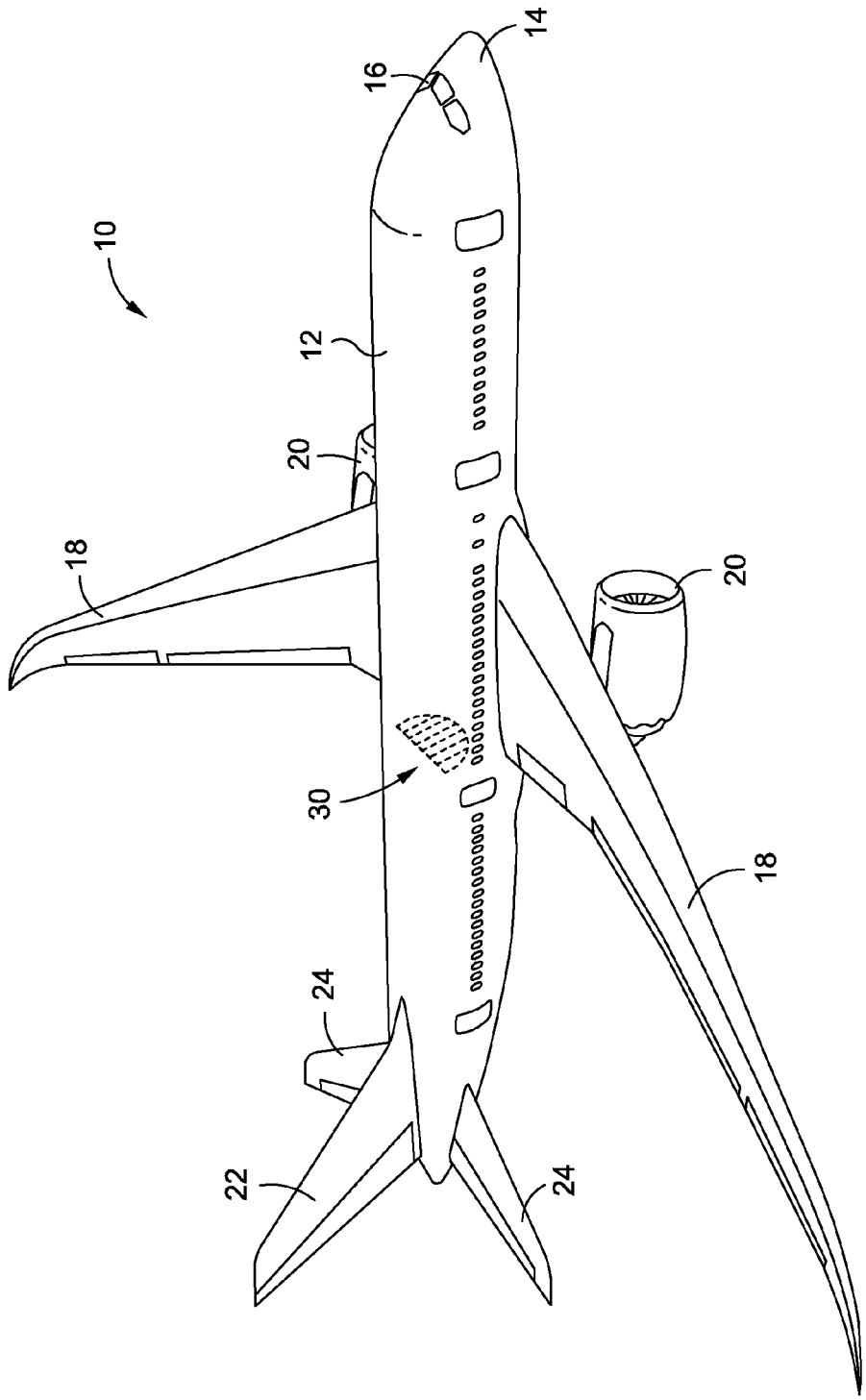
FIG. 1 is an illustration of a perspective view of an aircraft that may incorporate one or more exemplary embodiments of a composite hat-stiffened pressure web of the disclosure.

Now referring to the Figures, FIG. 1 is an illustration of a perspective view of an aircraft 10 that may incorporate one or more exemplary embodiments of a composite hat-stiffened pressure web 30 (see also FIGS. 6A, 7, 8) of the disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite hat-stiffened pressure webs 30, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more composite hat-stiffened pressure webs 30.

Figure 2A:
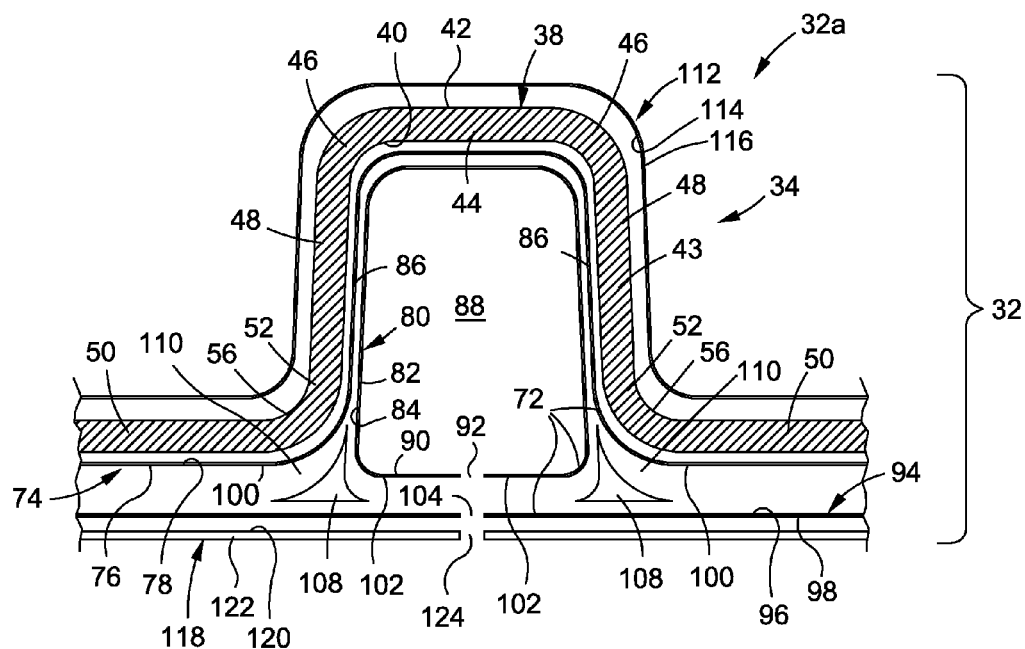
FIG. 2A is an illustration of a front sectional exploded view of one of the embodiments of a composite hat stiffener of the disclosure with a slot and in an uncured state.
Figure 2B:
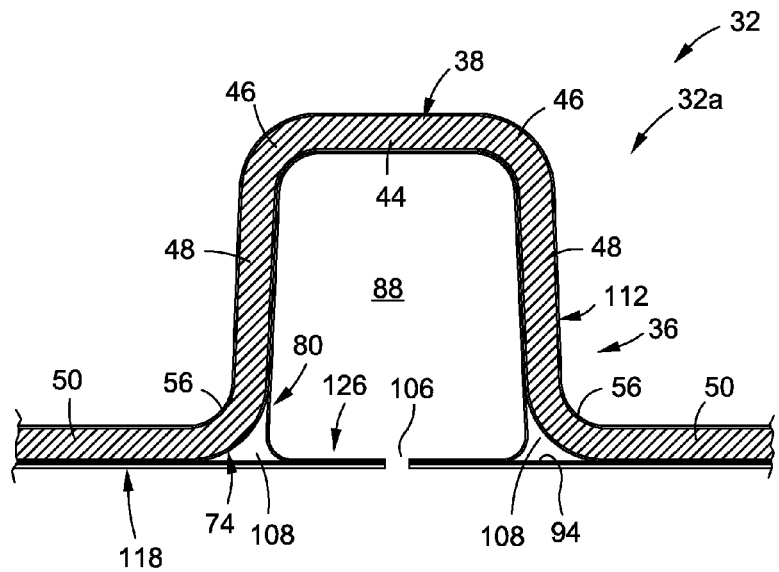
FIG. 2B is an illustration of the composite hat stiffener of FIG. 2A in a cured state.

In an embodiment of the disclosure, there is provided a composite hat stiffener 32 as shown in FIGS. 2A-2B. FIG. 2A is an illustration of a front sectional exploded view of one of the embodiments of the composite hat stiffener 32, such as in the form of composite hat stiffener 32a, shown in an uncured state 34, that is, prior to being cured, co-cured, or bonded together. FIG. 2B is an illustration of the composite hat stiffener 32 of FIG. 2A in a cured state 36, that is, after being cured, co-cured, or bonded together.

As shown in FIGS. 2A-2B, the composite hat stiffener 32, such as in the form of composite hat stiffener 32a, comprises a composite hat section 38. As shown in FIG. 2A, the composite hat section 38 has a first side 40 and a second side 42. The composite hat section 38 is preferably comprised of hat section composite plies 43 (see FIG. 2A), such as carbon fiber reinforced plastic (CFRP) tape, woven fabric, or another suitable composite tape, fabric, or fiber reinforced composite material.

As further shown in FIGS. 2A-2B, the composite hat section 38 comprises a cap 44 having opposite ends 46 from each other. As further shown in FIGS. 2A-2B, the composite hat section 38 further comprises a pair of webs 48 or sidewalls extending from the opposite ends 48, respectively, of the cap 44. As further shown in FIGS. 2A-2B, the composite hat section 38 further comprises a pair of flanges 50. Each flange 50 extends outwardly from a base portion 52 (see FIG. 2A) of each web 48, respectively. The pair of flanges 50 are designed to facilitate coupling or mounting of the composite hat stiffener 32 to a structure surface or substrate 54 (see FIG. 6A). As further shown in FIGS. 2A-2B, the composite hat section 38 comprises a pair of fillet radii 56. The pair of fillet radii 56 couple the pair of flanges 50 to the pair of webs 48, respectively. The pair of fillet radii 56 may add strength and reduce stresses at the intersection or fillet of the pair of flanges 50 and the pair of webs 48, and may be beneficial to the tooling or molding process by eliminating sharp corners that may cause cracking or erosion of tool or mold features. As used herein, a "fillet" means a rounded internal corner, and a "fillet radius" means the radius of the arc that connects the filleted components, in this case, the pair of flanges 50 and the pair of webs 48.

Figure 3A:
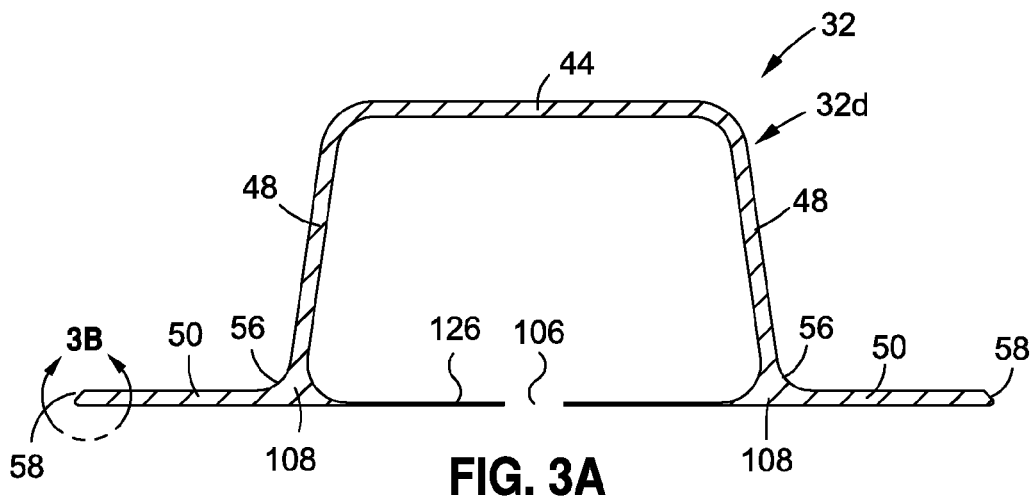
FIG. 3A is an illustration of a front cross-sectional view of one of the embodiments of a composite hat stiffener of the disclosure having chamfered edges.
Figure 3B:
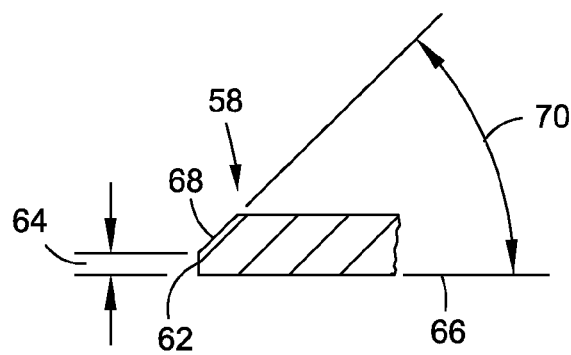
FIG. 3B is an illustration of a close-up view of the chamfered edge of circle 3B shown in FIG. 3A.

Each flange 50 preferably has a chamfered edge 58 (see FIGS. 3A-3B). FIG. 3A is an illustration of a front cross-sectional view of one of the embodiments of the composite hat stiffener 32, such as in the form of composite hat stiffener 32*d*, showing the chamfered edge 58 at the end of each flange 50. As used herein, a "chamfered edge" means a flat surface made by cutting off or removing the edge or corner of a material or part. FIG. 3A shows the cap 44, the pair of webs 48, the pair of flanges 50, the pair of fillet radii 56, a composite hat stiffener slot opening 106, a pair of radius filler noodles 108 (discussed in detail below), and a base center flange 126 of the composite hat stiffener 32, such as in the form of composite hat stiffener 32*d*. FIG. 3B is an illustration of a close-up view of the chamfered edge 58 of circle 3B shown in FIG. 3A. The chamfered edge 58 helps to prevent delamination of the composite hat stiffener 32 which may occur during removal of one or more caul plates 60 (see FIGS. 5A-5B), if such caul plates 60 are used, after curing, co-curing, bonding or co-bonding due to adhesive bleed. As shown in FIG. 3B, the chamfered edge 58 may comprise a first portion 62 having a width 64. The end of the first portion 62 is substantially perpendicular to a baseline 66 (see FIG. 3B). As further shown in FIG. 3B, the chamfered edge 58 comprises a second angled portion 68 forming an angle 70 to the baseline 66. The angle 70 of the chamfered edge 58 may preferably be about 45 degrees or less and greater than zero degrees to the baseline 66 or another suitable size angle. The shallower the angle 70, the better for bondline peeling resistance. The angle 70 chosen may depend on producibility tolerances and manufacturing design constraints for the structure or part being manufactured.

As further shown in FIG. 2A, the composite hat stiffener 32, such as in the form of composite hat stiffener 32*a*, comprises a plurality of composite stiffening plies 72 coupled to the composite hat section 38. The composite stiffening plies 72 may also be coupled to each other. The plurality of composite stiffening plies 72 preferably comprise a plurality of composite plies 73 (see FIG. 6A), such as carbon fiber reinforced plastic (CFRP) fabric or tape, or another suitable composite woven fabric, tape, or fiber reinforced composite material.

The hat section composite plies 43 forming the composite hat section 38 and the composite plies 73 forming the plurality of composite stiffening plies 72 may comprise a reinforcement material surrounded by and supported within a matrix material, such as for example, a prepreg material. The reinforcement material may comprise high-strength fibers, such as glass or carbon fibers, graphite, aromatic polyamide fiber, fiberglass, or another suitable reinforcement material. The matrix material may comprise various polymer or resin materials, such as epoxy, polyester, vinyl ester resins, polyetheretherketone polymer (PEEK), polyetherketoneketone polymer (PEKK), bismaleimide, or another suitable matrix material. As used herein, "prepreg" means a woven or braided fabric or cloth-like tape material, e.g., fiberglass or carbon fibers, that has been impregnated with an uncured or partially cured resin, which is flexible enough to be formed into a desired shape, then "cured," e.g., by the application of heat in an oven or an autoclave, to harden the resin into a strong, rigid, fiber-reinforced structure. The hat section composite plies 43 and the composite plies 73 may comprise preferably comprise carbon fiber reinforced plastic (CFRP) tape or woven fabric, or another suitable composite tape, fabric, or fiber reinforced composite material.

As further shown in FIGS. 2A-2B, the plurality of composite stiffening plies 72 comprises a body ply 74. The body ply 74 has a first side 76 and a second side 78 (see FIG. 2A). The second side 78 of the body ply 74 is coupled, for example, cured, co-cured, or bonded, to the first side 40 of the composite hat section 38. As shown in FIG. 2B, once the body ply 74 is coupled, for example, cured, co-cured, or bonded, to the composite hat section 38, the body ply 74 is integrated to the flanges 50, the webs 48 and the cap 44 of the first side 40 of the composite hat section 38. As discussed above for the plurality of composite stiffening plies 72, the body ply 74 preferably comprises a composite woven fabric, such as carbon fiber reinforced plastic (CFRP) fabric, a carbon fiber reinforced plastic (CFRP) tape, or another suitable composite woven fabric, tape, or fiber reinforced composite material.

Figure 5A:
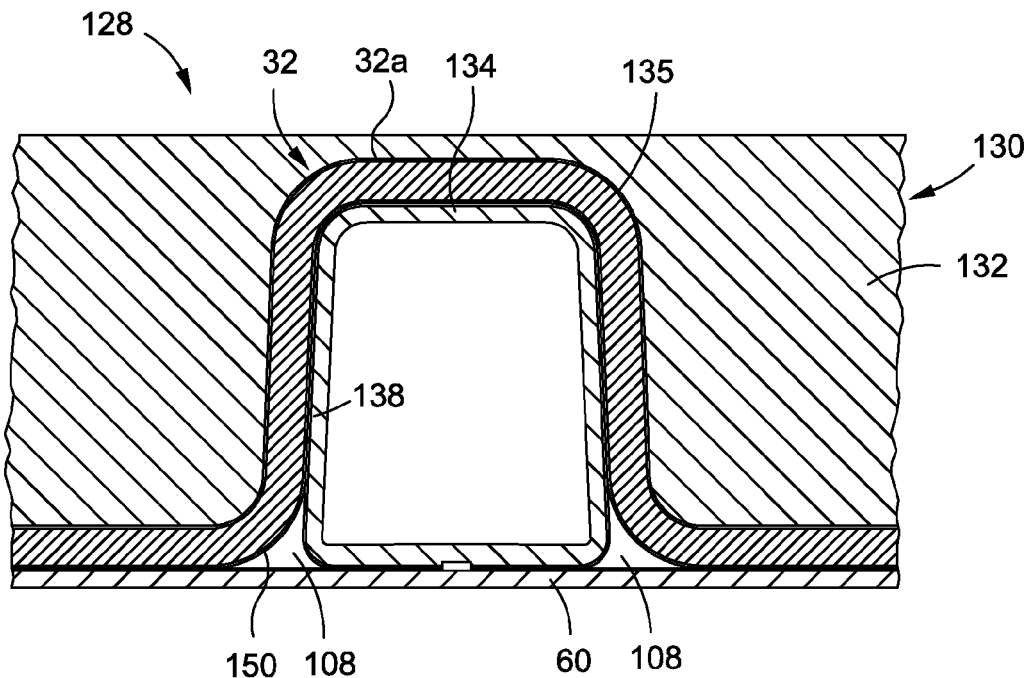
FIG. 5A is an illustration of a front sectional view of one of the embodiments of a composite hat stiffener of the disclosure shown within a tool assembly with a hat tool having a variable tool radius.

As further shown in FIGS. 2A-2B, the plurality of composite stiffening plies 72 comprises a wrap ply 80. The wrap ply 80 has a first side 82 and second side 84 (see FIG. 2A). The second side 84 of the wrap ply 80 is substantially coupled, for example, cured, co-cured, or bonded, to first portions 86 (see FIG. 2A) of the first side 76 of the body ply 74, and thus, is coupled to the composite hat section 38. Once the wrap ply 80 is coupled, for example, cured, co-cured, or bonded, to the composite hat section 38 via the body ply 74, the wrap ply 80 is integrated to the webs 48 and the cap 44 of the first side 40 of the composite hat section 38. As discussed above for the plurality of composite stiffening plies 72, the wrap ply 80 preferably comprises a composite woven fabric, such as carbon fiber reinforced plastic (CFRP) fabric, a carbon fiber reinforced plastic (CFRP) tape, or another suitable composite woven fabric, tape, or fiber reinforced composite material. The wrap ply 80 more preferably comprises a single wrap woven fabric ply. The first side 82 of the wrap ply 80 is adjacent a core portion 88 (see FIG. 2A) of the composite hat stiffener 32. The wrap ply 80 further has a base portion 90 (see FIG. 2A) in which, in one embodiment, a wrap ply slot opening 92 (see FIG. 2A) may be formed. In another embodiment, as shown in FIG. 5A, the wrap ply 80 does not have a wrap ply slot opening 92.

As further shown in FIGS. 2A-2B, the plurality of composite stiffening plies 72 comprises a base ply 94. The base ply 94 has a first side 96 and a second side 98. The first side 96 of the base ply 94 is substantially coupled, for example, cured, co-cured, or bonded, to second portions 100 (see FIG. 2A) of the first side 76 of the body ply 74, and to portions 102 (see FIG. 2A) of the base portion 90 of the wrap ply 80, and thus, is coupled to the composite hat section 38. Once the base ply 94 is coupled, for example, cured, co-cured, or bonded, to the composite hat section 38 via the body ply 74, the base ply 94 is integrated to the flanges 50 of the first side 40 of the composite hat section 38. As discussed above for the plurality of composite stiffening plies 72, the base play 94 preferably comprises a composite woven fabric, such as carbon fiber reinforced plastic (CFRP) fabric, a carbon fiber reinforced plastic (CFRP) tape, or another suitable composite woven fabric, tape, or fiber reinforced composite material. The base ply 94 more preferably comprises a single cap woven fabric ply.

As shown in FIG. 2A, the base ply 94 may further have, in one embodiment, a base ply slot opening 104. In another embodiment, as shown in FIG. 5A, the base ply 94 does not have a base ply slot opening 104. As shown in FIG. 2A, prior to when the base ply 94 is coupled, for example, cured, co-cured, or bonded, to the wrap ply 80, the base ply slot opening 104 and the wrap ply slot opening 92 may be aligned to form a composite hat stiffener slot opening 106 during curing or bonding. The composite hat stiffener slot opening 106 may be used to prevent distortion of the composite hat stiffener 32 during curing or bonding. In addition, when the composite hat stiffener 32 is cured or bonded, the resulting composite hat stiffener slot opening 106 may be small or not of a large enough size as desired. Thus, after curing or bonding of the composite hat stiffener 32, the composite hat stiffener slot opening 106 may be cut or trimmed further to enlarge or increase the size of the composite hat stiffener slot opening 106 in order, for example, to accommodate nondestructive inspection (NDI) access.

As further shown in FIGS. 2A-2B, the composite hat stiffener 32, such as in the form of composite hat stiffener 32a, comprises a pair of radius filler noodles 108. The pair of radius filler noodles 108 are preferably coupled to or adjacent to the composite hat section 38 and are preferably disposed between and intersect the plurality of composite stiffening plies 72 which form radius filler noodle regions 110 (see FIG. 2A) for the pair of radius filler noodles 108 to be disposed within. For purposes of this application, the term "radius filler noodle region" means the substantially triangular region where the composite hat section 38 and the plurality of composite stiffening plies 72 come together or intersect. The radius filler noodles 108 preferably comprise a rolled tape material, such as a rolled composite tape, uni-directional fibers, epoxy, adhesive, tape and adhesive, laminated tape, closed cell foam, wood, or another suitable material. Preferably, the composite hat stiffener 32 minimizes a pull-off load at the radius filler noodle 108 or minimizes or reduces the effects of pull-off load at the radius filler noodle 108, which may result in eliminating or minimizing use of one or more radius filler elements (not shown), fasteners (not shown), or angle fittings (not shown) to react the pull-off load. In turn, this may result in increased cost savings due to the elimination or minimization of the cost of the such radius filler elements, fasteners, or angle fittings and elimination or minimization of the labor and manufacturing costs to install and maintain such radius filler elements, fasteners, or angle fittings.

As further shown in FIGS. 2A-2B, the composite hat stiffener 32, such as in the form of composite hat stiffener 32a, comprises an outer ply 112. The outer ply 112 has a first side 114 and a second side 116 (see FIG. 2A). The first side 114 of the outer ply 112 is coupled, for example, cured, co-cured, bonded, or co-bonded, to the second side 42 of the composite hat section 38. Preferably, the outer ply 112 comprises a glass material, such as, for example, a fiberglass material, or another suitable glass material. Preferably, the outer ply 112 comprises a galvanic corrosion protection material that protects any adjacent metal structures or parts, such as adjacent aluminum or steel structures, adjacent the composite hat stiffener 32, against galvanic corrosion. In addition, preferably, the outer ply 112 comprises a drill breakout protection material that protects against drill breakout or damage during drilling of the composite hat stiffener 32 or adjacent structures or parts.

As further shown in FIGS. 2A-2B, the composite hat stiffener 32 may comprise a peel ply 118. The peel ply 118 has a first side 120 and a second side 122 (see FIG. 2A). The first side 120 of the peel ply 118 may be coupled to the second side 98 of the base ply 94. The peel ply 118 may further have a peel ply slot opening 124 (see FIG. 2A). In another embodiment, as shown in FIG. 5A, the peel ply 118 does not have a peel ply slot opening 124. Preferably, the peel ply slot opening 124, if present, is also aligned with the base ply slot opening 104 and the wrap ply slot opening 92 to form the composite hat stiffener slot opening 106. As shown in FIG. 2A, prior to when the peel ply 118 is coupled to the base ply 94, the base ply slot opening 104, the peel ply slot opening 124, and the wrap ply slot opening 92 may be aligned. Preferably, the peel ply 118 comprises a fabric material, such as a fiberglass fabric coated with a release agent, coated and uncoated nylon fabrics, or another suitable fabric material. The peel ply 118 may be bonded to the base ply 94, and the peel ply 118 may preferably be removable and may be peeled off and discarded after use. The peel ply 118 may be used to protect the composite hat stiffener 32 from dirt, dust or contaminates that it may be exposed to before being bonded to the composite hat-stiffened pressure web 30 (see FIG. 6A). Further, The peel ply 118 may be used to prepare a bonding surface. The peel ply 118 may leave a roughened surface that does not require further preparation before curing, laminating, or bonding continues, i.e. sanding/scuffing the composite hat stiffener 32.

Figure 4A:
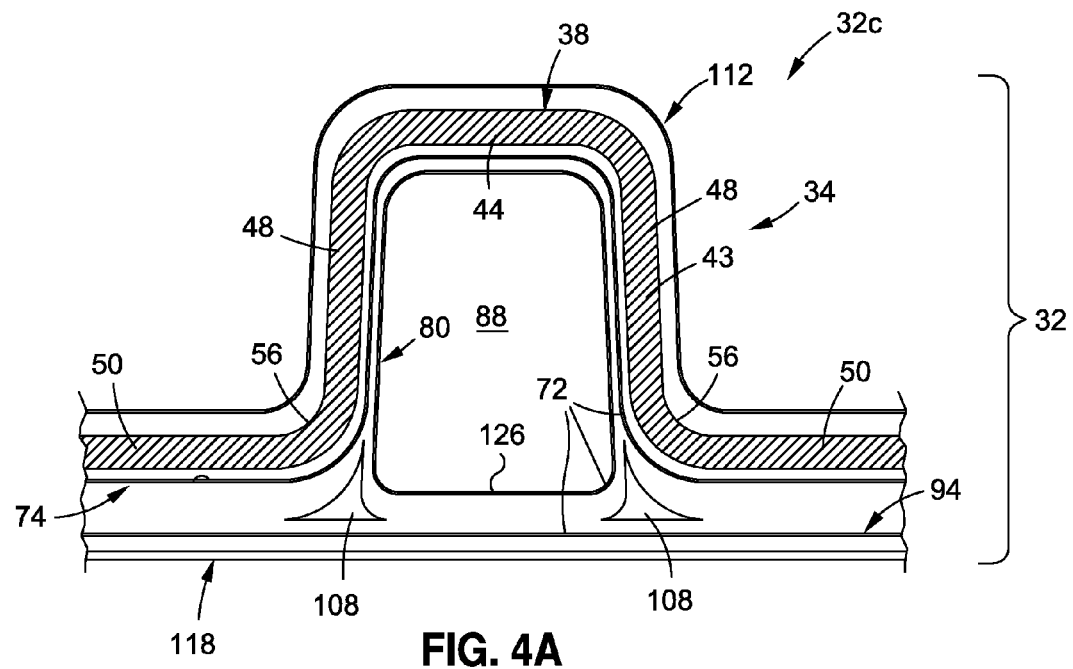
FIG. 4A is an illustration of a front sectional exploded view of another one of the embodiments of a composite hat stiffener of the disclosure with no slot and in an uncured state.
Figure 4B:
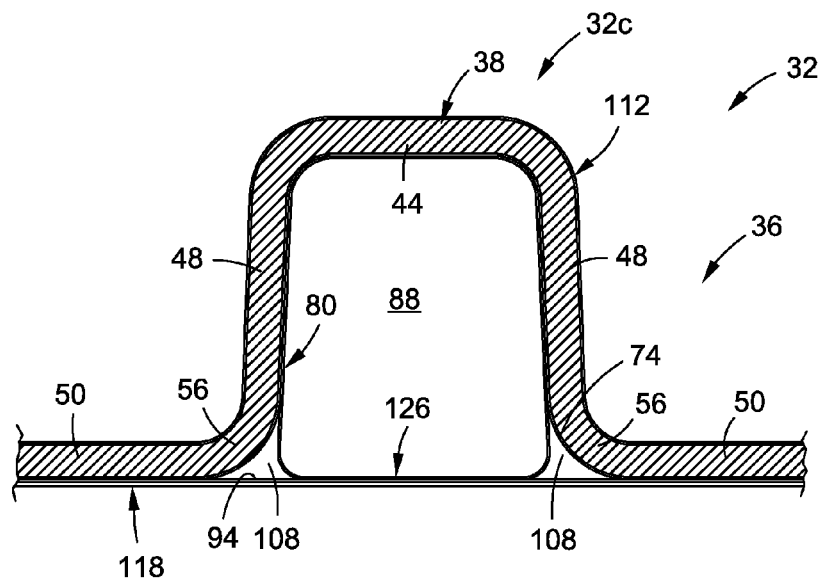
FIG. 4B is an illustration of the composite hat stiffener of FIG. 4A in a cured state.

FIG. 4A is an illustration of a front sectional exploded view of another one of the embodiments of a composite hat stiffener 32, such as in the form of composite hat stiffener 32c, with no composite hat stiffener slot opening 106 (see FIG. 2A) and in an uncured state 34. FIG. 4B is an illustration of the composite hat stiffener 32, such as in the form of composite hat stiffener 32c, of FIG. 4A in a cured state 36. FIGS. 4A-4B show a composite hat section 38. preferably comprised of hat section composite plies 43 (see FIG. 4A), such as carbon fiber reinforced plastic (CFRP) tape, woven fabric, or another suitable composite tape, fabric, or fiber reinforced composite material. FIGS. 4A-4B further show the cap 44, the pair of webs 48 or sidewalls extending from opposite ends 48 of the cap 44, respectively, and the pair of flanges 50. FIGS. 4A-4B further show the pair of fillet radii 56 which couple the pair of flanges 50 to the pair of webs 48, respectively, the pair of radius filler noodles 108, the core portion 88, and the base center flange 126. As shown in FIG. 4A, the composite hat stiffener 32, such as in the form of composite hat stiffener 32c, further comprises a plurality of composite stiffening plies 72 comprising a body ply 74 (see FIGS. 4A-4B), a wrap ply 80 (see FIGS. 4A-4B), and the base ply 94 (see FIGS. 4A-4B). FIGS. 4A-4B further show the outer ply 112 and the peel ply 118.

Figure 6A:
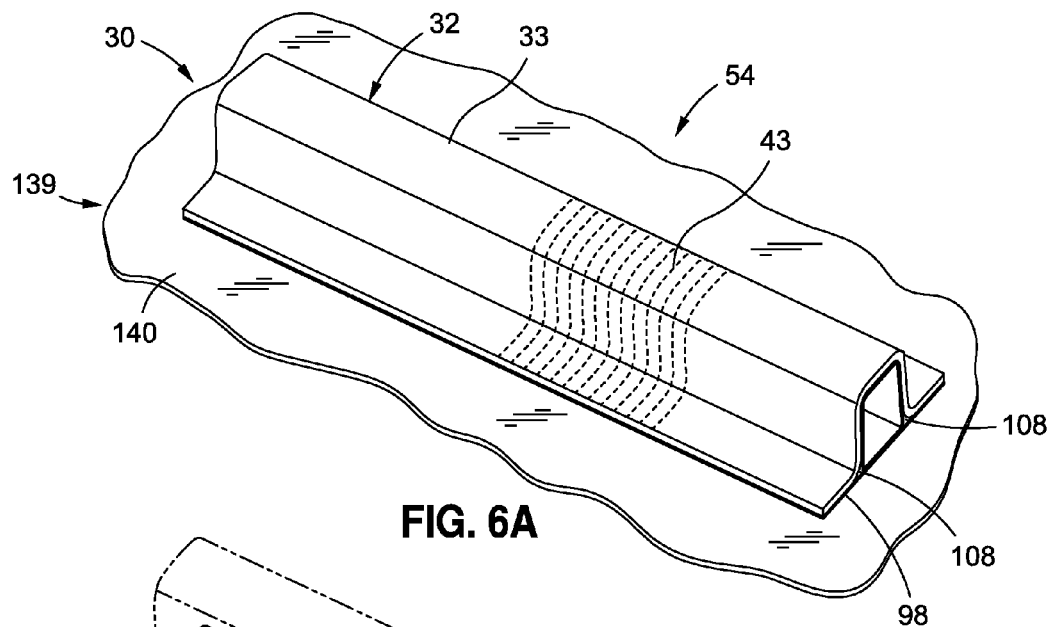
FIG. 6A is an illustration of a perspective view of one of the embodiments of a composite hat-stiffened pressure web of the disclosure.

In another embodiment of the disclosure, as shown in FIG. 6A, there is provided a composite hat-stiffened pressure web 30. FIG. 6A is an illustration of a perspective view of one of the embodiments of the composite hat-stiffened pressure web 30 of the disclosure. As shown in FIG. 6A, the composite hat-stiffened pressure web 30 comprises one of the embodiments of the composite hat stiffener 32, as discussed in detail above. The composite hat stiffener 30 is preferably cured and in the form of a pre-cured composite hat stiffener 33. FIG. 6A shows the pre-cured composite hat stiffener 33 bonded or co-bonded to a structure surface or substrate 54. Preferably, as shown in FIG. 6A, the structure surface or substrate 54 is a pressure web 139, such as an uncured composite pressure web 140. Preferably, the surface of the uncured composite pressure web 140 is flat or relatively flat. Thus, in one embodiment, the composite hat-stiffened pressure web 30 comprises the pre-cured composite hat stiffener 33 bonded or co-bonded to the uncured composite pressure web 140.

Figure 6B:
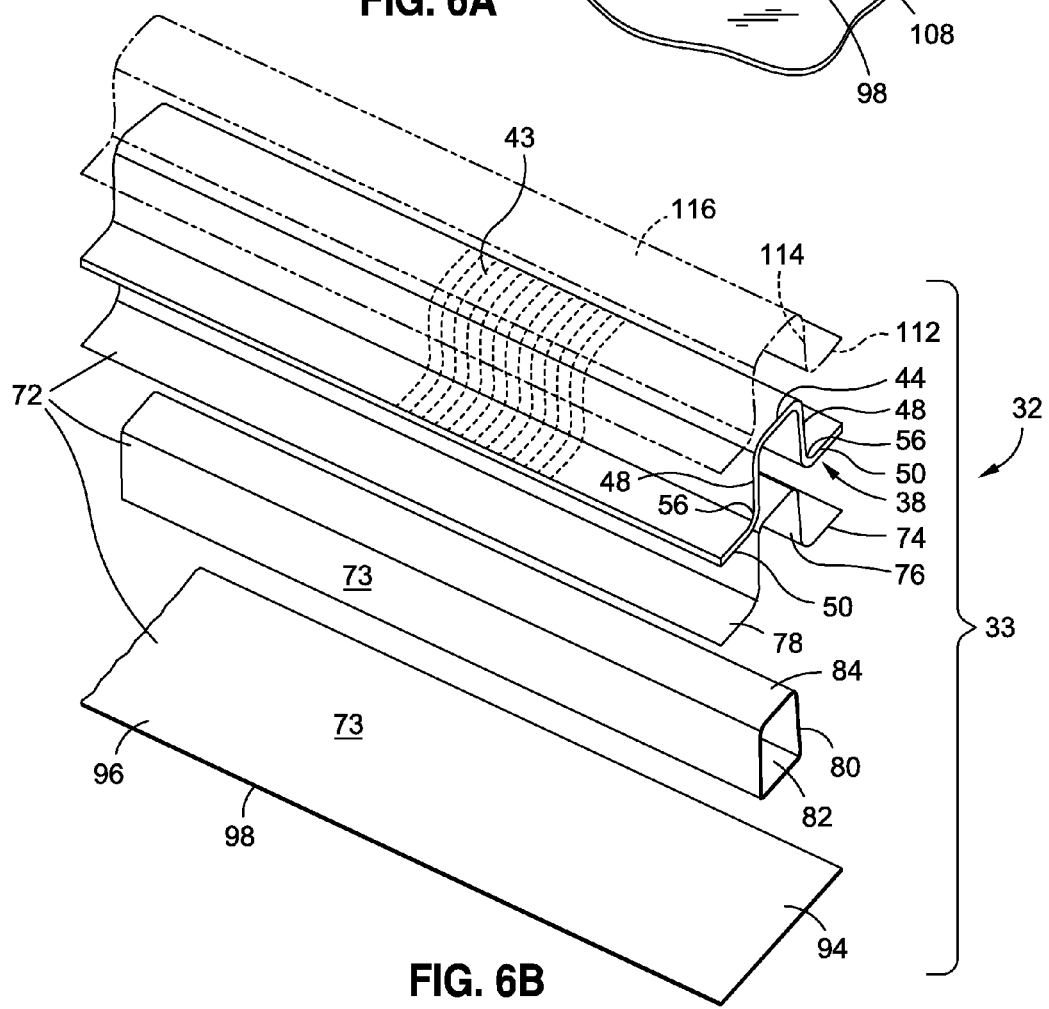
FIG. 6B is an illustration of an exploded perspective view of the composite hat stiffener portion of the composite hat-stiffened pressure web FIG. 6A.

FIG. 6B is an illustration of an exploded perspective view of the composite hat stiffener 32, in the form of a pre-cured composite hat stiffener 33, of the composite hat-stiffened pressure web 30 of FIG. 6A. As shown in FIG. 6B, the composite hat stiffener 32, in the form of a pre-cured composite hat stiffener 33, comprises the composite hat section 38 (see FIG. 6B), the plurality of composite stiffening plies 72

(see FIG. 6B), the outer ply 112 (see FIG. 6B), and the pair of radius filler noodles 108 (see FIG. 6A). The composite hat section 38 (see FIG. 6B) is discussed in detail above with respect to FIG. 2A, and preferably comprises the cap 44 (see FIG. 2A), the pair of webs 48 (see FIG. 2A), the pair of flanges 50 (see FIG. 2A), and the pair of fillet radii 56 (see FIG. 2A). The composite hat section 38 is preferably comprised of hat section composite plies 43 (see FIG. 6B), such as made of carbon fiber reinforced plastic (CFRP) tape, woven fabric, or another suitable composite tape, fabric, or fiber reinforced composite material.

As further shown in FIG. 6B, the composite stiffening plies 72 comprise the body ply 74 for coupling adjacent to the composite hat section 38, the wrap ply 80 for coupling adjacent to the body ply 74, and the base ply 94 for coupling adjacent to the body ply 74 and the wrap ply 80. The second side 98 (see FIGS. 6A-6B) of the base ply 94 (see FIG. 6B) is adjacent the structure surface or substrate 54 (see FIG. 6A), such as the uncured composite pressure web 140 (see FIG. 6A). The plurality of composite stiffening plies 72, including the body ply 74, the wrap ply 80, and the base ply 94, preferably comprise a plurality of composite plies 73 (see FIG. 6B), such as carbon fiber reinforced plastic (CFRP) fabric, carbon fiber reinforced plastic (CFRP) tape, or another suitable composite woven fabric, tape, or fiber reinforced composite material. Although FIG. 6B does not show a peel ply 118 (see FIG. 2A), a peel ply 118 may be used or applied to the second side 98 of the base ply 94. The composite hat-stiffened pressure web 30 provides the composite hat stiffener 32 bonded to the uncured composite pressure web 140 to provide improved stability to the uncured composite pressure web 140, as compared to an existing composite I-beam stiffened pressure web (not shown).

Figure 7:
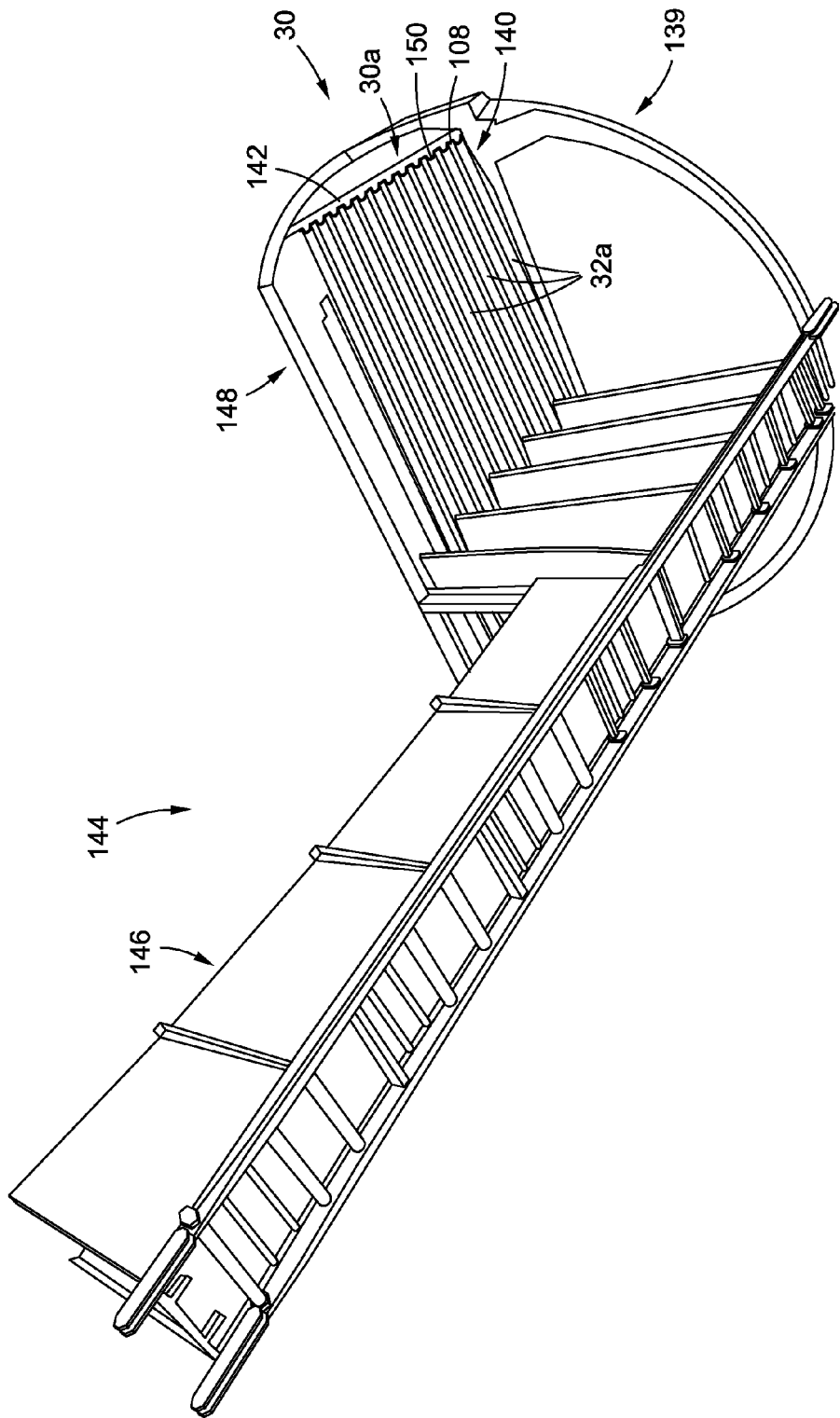
FIG. 7 is an illustration of a bottom perspective view of an aircraft horizontal pressure deck with one of the embodiments of a composite hat-stiffened pressure web of the disclosure.

In one embodiment, as shown in FIG. 7, the uncured composite pressure web 140 may comprise an aircraft horizontal pressure deck pressure web 142. FIG. 7 is an illustration of a bottom perspective view of an aircraft horizontal pressure deck 144 with one of the embodiments of the composite hat-stiffened pressure web 30, such as in the form of composite hat-stiffened pressure web 30a. FIG. 7 shows the aircraft horizontal pressure deck 144 with a keel beam portion 146 and a pressure deck portion 148. The pressure deck portion 148 includes a pressure web 139, such as an uncured composite pressure web 140, preferably in the form of an aircraft horizontal pressure deck pressure web 142. Preferably, the uncured composite pressure web 140, such as in the form of an aircraft horizontal pressure deck pressure web 142, has a flat or relatively flat surface pressure web or panel. In this embodiment, the composite hat-stiffened pressure web 30a comprises a plurality of the composite hat stiffeners 32a (see also FIGS. 2A, 5A) bonded or co-bonded to the aircraft horizontal pressure deck pressure web 142. Further, in this embodiment, the pair of radius filler noodles 108 of the composite hat stiffeners 32a bonded or co-bonded to the aircraft horizontal pressure deck pressure web 142 each comprises a variable noodle radius 150 (see also FIG. 5A).

Figure 8:
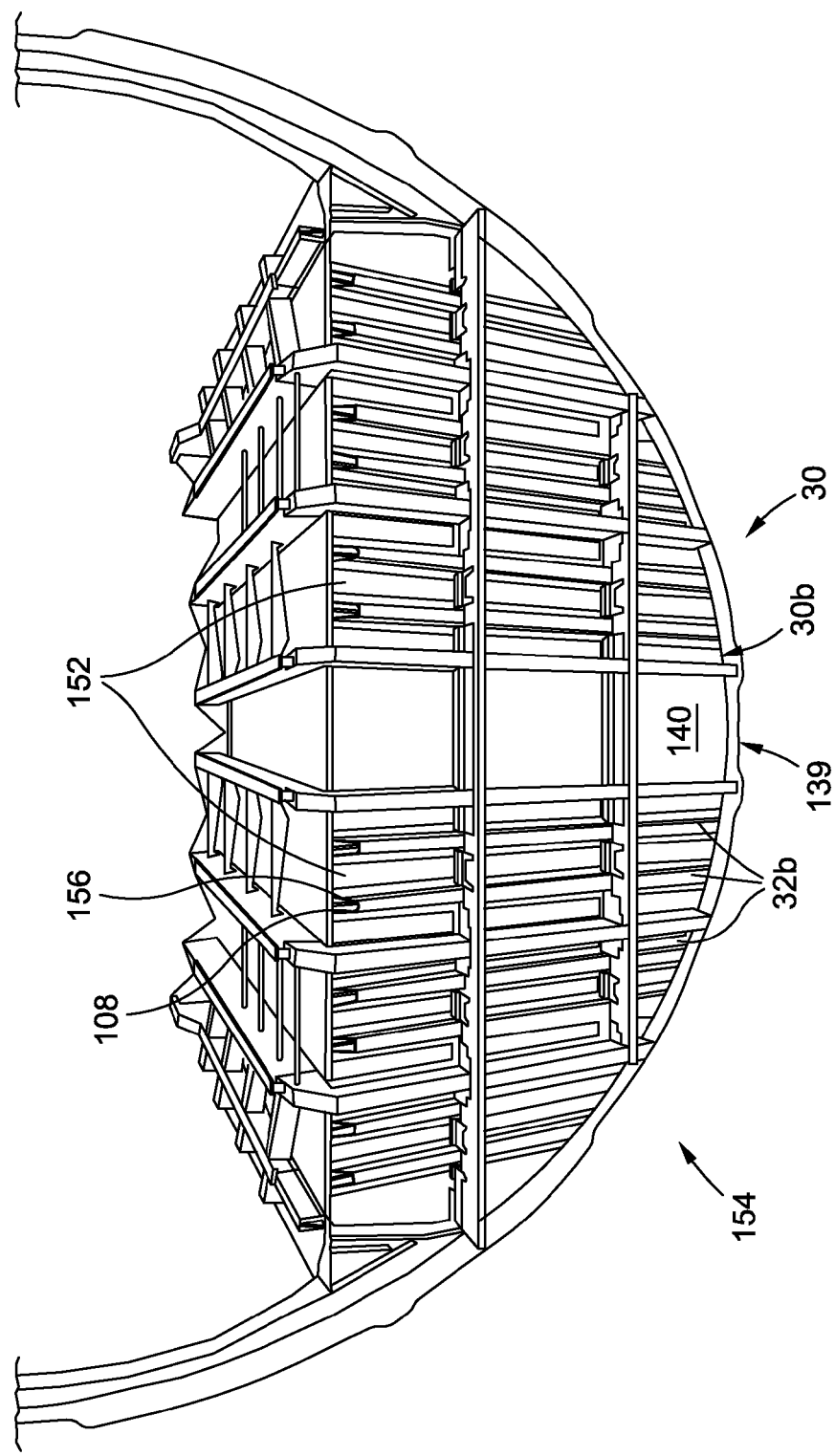
FIG. 8 is an illustration of a back perspective view of a portion of an aircraft aft wheel well bulkhead with another one of the embodiments of a composite hat-stiffened pressure web of the disclosure; and, FIG. 9 is a flow diagram of one of the embodiments of a method of the disclosure.

In another embodiment, as shown in FIG. 8, the pressure web 139, such as the uncured composite pressure web 140, may comprise an aircraft aft wheel well bulkhead pressure web 152. FIG. 8 is an illustration of a back perspective view of a portion of an aircraft aft wheel well bulkhead 154 with another one of the embodiments of the composite hat-stiffened pressure web 30, such as in the form of composite hat-stiffened pressure web 30b. FIG. 8 shows a portion of the aircraft aft wheel well bulkhead 154 with the uncured composite pressure web 140, in the form of the aircraft aft wheel well bulkhead pressure web 152. Preferably, the uncured composite pressure web 140, such as in the form of the aircraft aft wheel well bulkhead pressure web 152, has a flat or relatively flat surface pressure web or panel. In this embodiment, the composite hat-stiffened pressure web 30b comprises a plurality of the composite hat stiffeners 32b (see also FIG. 5B) bonded or co-bonded to the aircraft aft wheel well bulkhead pressure web 152. Further, in this embodiment, the pair of radius filler noodles 108 of the composite hat stiffeners 32b bonded or co-bonded to the aircraft aft wheel well bulkhead pressure web 152 each comprises a constant noodle radius 156 (see also FIG. 5B).

Figure 9:
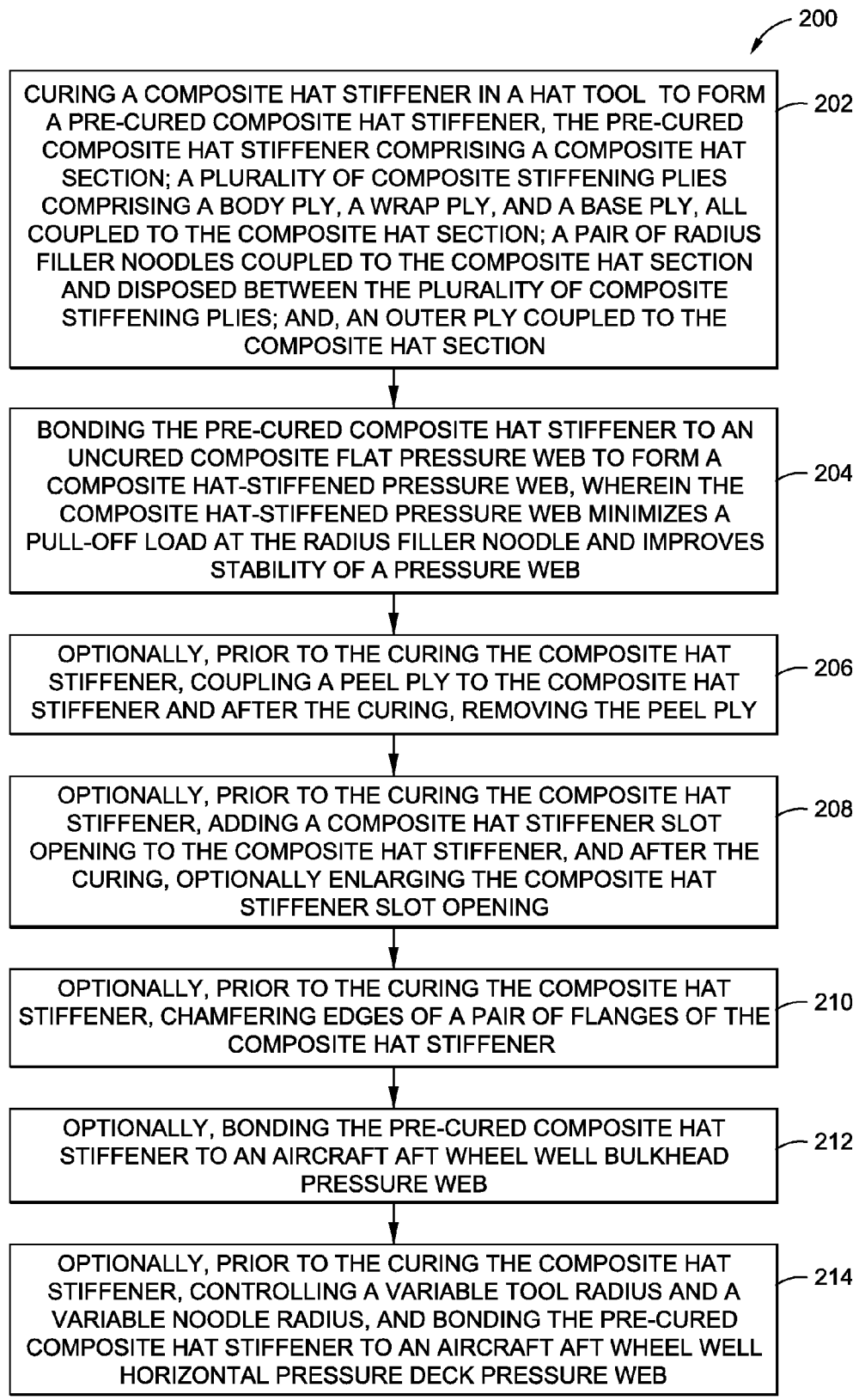

In another embodiment of the disclosure, there is provided a method 200 (see FIG. 9) of making a composite hat-stiffened pressure web 30 (see FIG. 6A) to reduce or minimize the effects of pull-off load at the plurality of radius filler noodles 108 or the radius filler noodle 108 (see FIG. 2A), to reduce criticality to pull-off load at the plurality of radius filler noodles 108 or the radius filler noodle 108 (see FIG. 2A) or by the composite hat-stiffened pressure web 30, and to improve stability of a pressure web 139 (see FIGS. 6A, 7, 8), such as an uncured composite pressure web 140 (see FIG. 6A). FIG. 9 is a flow diagram of one of the embodiments of the method 200 of the disclosure. In particular, novel configurations of pressure webs 139 are provided to make wheel well panels, such as aft wheel well panels, including for the aircraft aft wheel well bulkhead 154 (see FIG. 8), and panels for the aircraft horizontal pressure deck 144 (see FIG. 7).

The method 200 comprises step 202 of curing a composite hat stiffener 32, such as for example, a composite hat stiffener 32a (see FIG. 5A) or a composite hat stiffener 32b (see FIG. 5B) in a hat tool 130 (see FIGS. 5A-5B) to form a pre-cured composite hat stiffener 33 (see FIG. 6A). The pre-cured composite hat stiffener 33 comprises a composite hat section 38 (see FIG. 6B). The pre-cured composite hat stiffener 33 further comprises a plurality of composite stiffening plies 72 (see FIG. 6B) comprising a body ply 74 (see FIG. 6B), a wrap ply 80 (see FIG. 6B), and a base ply 94 (see FIG. 6B), all coupled to the composite hat section 38 (see FIG. 6B). The pre-cured composite hat stiffener 33 further comprises a pair of radius filler noodles 108 (see FIG. 6A) coupled to the composite hat section 38 and disposed between the plurality of composite stiffening plies 72. The pre-cured composite hat stiffener 33 further comprises an outer ply 112 (see FIG. 6B) coupled to the composite hat section 38.

FIG. 5A is an illustration of a front sectional view of one of the embodiments of a composite hat stiffener 32, such as in the form of composite hat stiffener 32a, shown within a tool or mold assembly 128. As shown in FIG. 5A, the tool or mold assembly 128 comprises a hat tool or mold 130, such as a female hat tool or mold 132.

Prior to curing, the composite hat stiffener 32, such as in the form of composite hat stiffener 32a, may be formed by laying up the hat section composite plies 43 (see FIG. 6B) of the composite hat section 38 (see FIG. 6B), the composite plies 73 (see FIG. 6B) of the plurality of composite stiffening plies 72 (see FIG. 6B), and the outer ply 112 (see FIG. 6B) on the surface of the hat tool or mold 130 (see FIG. 5A). The hat section composite plies 43, the composite plies 73, and the outer ply 112 may be laid up by hand on the hat tool or mold 130. The pair of radius filler noodles 108 are preferably rolled, formed and inserted into the uncured composite hat stiffener 32a in the hat tool or mold 130. Alternatively, the hat section composite plies 43, the composite plies 73, and the outer ply 112 may be laid up on a tooling surface (not shown) such as a flat tooling surface by hand or through use of an automatic tape lay-up machine and then pressed into the hat tool or mold 130, such as by a process utilizing hot drape forming or another known forming process, in order to form the hat section composite plies 43, the composite plies 73, the outer ply 112, and the pair of radius filler noodles 108 into the shape of the composite hat stiffener 32. Alternatively, other suitable known lay-up or forming processes may be used. Prior to curing, a mandrel (not shown) may be inserted in the core portion 88 (see FIG. 2A) of the composite hat stiffener 32, such as in the form of hat stiffener 32*a*, for winding the plies over or around the mandrel, and then the mandrel may be removed after curing. The mandrel may comprise soft tooling or hard tooling known in the art.

As shown in FIG. 5A, the tool or mold assembly 128 preferably further comprises a caul plate 60. The caul plate 60 is preferably of a similar size and shape to the size and shape of the composite hat stiffener 32. The caul plate 60 is preferably placed in contact with the composite hat stiffener 32 during curing to transmit pressure, to assist in forcing the composite material into the variable tool radius 135 and to smooth out any irregularities and provide a smooth surface.

As shown in FIG. 5A, the tool or mold assembly 128 preferably further comprises a bladder element 134. The bladder element 134 is preferably inflatable in order to exert pressure from the interior of the hat tool or mold 130 against the composite hat stiffener 32 during curing. The bladder element 134 preferably has a constant bladder cross-section 138. Because the bladder element 134 has a constant bladder cross-section 138 and the radius of the bladder element 134 preferably does not change, it is important to control the radius of the hat tool or mold 130 that contacts the exterior of the composite hat stiffener 32. In one embodiment, where the composite hat stiffener 32, such as in the form of composite hat stiffener 32*a*, is cured to form a pre-cured composite hat stiffener 33 and is bonded or co-bonded to the uncured composite pressure web 140, such as in the form of the aircraft horizontal pressure deck pressure web 142 (see FIG. 7), the hat tool or mold 130 preferably has a variable tool radius 135 (see FIG. 5A) and the pair of radius filler noodles 108 each have a variable noodle radius 150 (see FIG. 5A). The pre-cured composite hat stiffener 33 that is bonded to the uncured composite pressure web 140, such as in the form of the aircraft horizontal pressure deck pressure web 142 (see FIG. 7), has ply drops and thus has a variable noodle radius 150. As used herein, "ply drops" means a series of shortened or terminated individual plies or groups of plies introduced at various locations within the composite part or lamination accomplished by thickness tapering from a thick cross-section to a thinner cross-section, for example, to create a composite part having a desired surface contour or shape. The ply drops are preferably machined into the bond assembly jig (BAJ) surfaces of the hat tool or mold to which the uncured composite pressure web 140 is laid up on an cured to allow for a bonding surface, preferably a flat or relatively flat bonding surface, between the pre-cured composite hat stiffener 33 and the uncured composite pressure web 140, such as in the form of the aircraft horizontal pressure deck pressure web 142. The pair of radius filler noodles 108 of the pre-cured composite hat stiffener 33 bonded to the aircraft horizontal pressure deck pressure web 142 may have a noodle overfill ratio, which means that due to the material of the radius filler noodle 108 shrinking during curing, the radius filler noodle 108 may be overfilled or made larger than the noodle region it fits into, for example, a noodle overfill ratio of 100%.

Figure 5B:
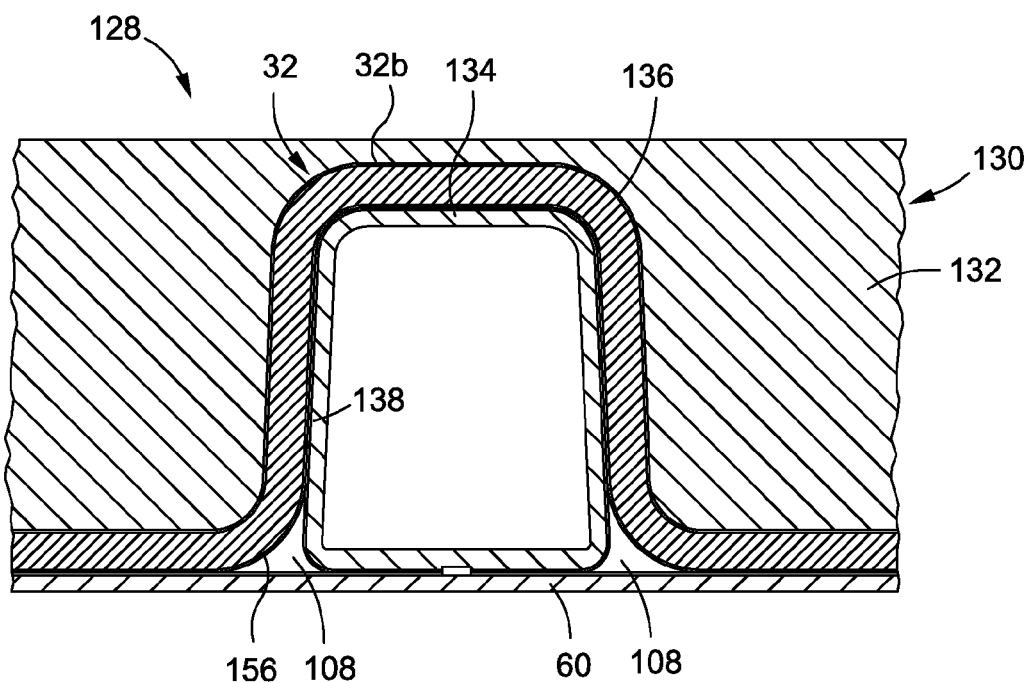
FIG. 5B is an illustration of a front sectional view of another one of the embodiments of a composite hat stiffener of the disclosure shown within a tool assembly with a hat tool having a constant tool radius.

FIG. 5B is an illustration of a front sectional view of another one of the embodiments of a composite hat stiffener 32, such as in the form of composite hat stiffener 32*b*, shown within the mold or tool assembly 128. As shown in FIG. 5B, the tool or mold assembly 128 comprises a hat tool or mold 130, such as a female hat tool or mold 132, a caul plate 60 as discussed above, and a bladder element 134 as discussed above. The bladder element 134 preferably has a constant bladder cross-section 138. In another embodiment, where the composite hat stiffener 32, such as in the form of composite hat stiffener 32*b*, is cured to form a pre-cured composite hat stiffener 33 and is bonded or co-bonded to the uncured composite pressure web 140, such as in the form of the aircraft aft wheel well bulkhead pressure web 152 (see FIG. 8), the hat tool or mold 130 preferably has a constant tool radius 136 (see FIG. 5B) and the pair of radius filler noodles 108 each preferably have a constant noodle radius 156 (see FIG. 5B). In both the aircraft horizontal pressure deck pressure web 142 and the aircraft aft wheel well bulkhead pressure web 152, the part radius adjacent to the variable noodle radius 150 is constant. In the aircraft aft wheel well bulkhead pressure web 152, the radii are constant. In the aircraft horizontal pressure deck pressure web 142, the variable tool radius 135 is variable. The pre-cured composite hat stiffener 33 that is bonded to the uncured composite pressure web 140, such as in the form of the aircraft aft wheel well bulkhead pressure web 152 (see FIG. 8), has no ply drops and thus has a constant noodle radius 156. Although there are no ply drops with this embodiment, ply drops are preferably still machined into the surfaces of the uncured composite pressure web 140 to allow for a bonding surface, preferably a flat or relatively flat bonding surface, between the pre-cured composite hat stiffener 33 and the uncured composite pressure web 140, such as in the form of the aircraft aft wheel well bulkhead pressure web 152. The pair of radius filler noodles 108 of the pre-cured composite hat stiffener 33 bonded to the aircraft aft wheel well bulkhead pressure web 152 may have a noodle overfill ratio of 115%, which means that due to the material of the radius filler noodle 108 shrinking during curing, the radius filler noodle 108 may be overfilled or made larger than the noodle region it fits into, for example, a noodle overfill ratio of 115%.

The curing step 202 may comprise a known curing process such as an autoclave curing process, a vacuum bag curing process, a combination autoclave and vacuum bagging curing process, a compression mold curing process, a resin transfer molding process, a room temperature curing process, or another suitable curing process. The curing may take place at an elevated temperature and pressure as required per material specifications to effectively cure the composite hat stiffener 32. During curing, the composite material of the composite hat stiffener 32 hardens and holds the shape of the hat tool or mold 130. Once the pre-cured composite hat stiffener 33 is formed, the pre-cured composite hat stiffener 33 may be removed from the hat tool or mold 130.

As further shown in FIG. 9, the method 200 further comprises step 204 of bonding or co-bonding the pre-cured composite hat stiffener 33 (see FIG. 6A) to a structure surface or substrate 54 (see FIG. 6A), preferably in a pressure web 139, such as an uncured composite pressure web 140 (see FIG. 6A), to form a composite hat-stiffened pressure web 30 (see FIG. 6A). The pre-cured composite hat stiffener 33 may be bonded or co-bonded to the uncured composite pressure web 140 via adhesive bonding, co-curing, secondary bonding, or another known bonding or co-bonding process. The bonding step 204 may take place at an elevated temperature and pressure as required per material specifications to effectively bond or co-bond the pre-cured composite hat stiffener 33 (see FIG. 6A) to the uncured composite pressure web 140.

The composite hat-stiffened pressure web 30 preferably minimizes a pull-off load at the plurality of radius noodle fillers 108 or at the radius noodle filler 108 and improves stability of the pressure web 139 (see FIG. 6A). The pre-cured composite hat stiffener 33 bonded or co-bonded to the uncured composite pressure web 140 provides improved stability and buckling resistance to the uncured composite pressure web 140, as compared to existing and known composite I-beam stiffened composite pressure web or skin panels (not shown).

As further shown in FIG. 9, the method 200 may comprise prior to step 202 of curing the composite hat stiffener 32, an optional step 206 of coupling a peel ply 118 to the composite hat stiffener 32, and after curing, removing the peel ply 118 from the composite hat stiffener 32. As further shown in FIG. 9, the method 200 may comprise prior to step 202 of curing the composite hat stiffener 32, an optional step 208 of adding a composite hat stiffener slot opening 106 to the composite hat stiffener 32, and after curing, optionally enlarging the composite hat stiffener slot opening 106, as discussed above. As further shown in FIG. 9, the method 200 may comprise prior to step 202 of curing the composite hat stiffener 32, an optional step 210 of chamfering edges of a pair of flanges 50 (see FIGS. 3A-3B) of the composite hat stiffener 32.

As further shown in FIG. 9, the step 204 of bonding of the method 200 may further comprise an optional step 212 of bonding the pre-cured composite hat stiffener 33 to an aircraft wheel well bulkhead pressure web 152 (see FIG. 8). As further shown in FIG. 9, the method 200 may comprise prior to step 202 of curing the composite hat stiffener 32, optional step 214 of controlling a variable tool radius 135 (see FIG. 5A) and a variable noodle radius 150 (see FIG. 5A), and wherein the step 204 of bonding further comprises bonding the pre-cured composite hat stiffener 33 to an aircraft horizontal pressure deck pressure web 142 (see FIG. 7).

As will be appreciated by those of skill in the art, incorporating the novel composite hat-stiffened pressure web 30 of the disclosure into, e.g., the wheel well panels of a composite bodied aircraft, for example, into the aircraft horizontal pressure deck 144 (see FIG. 7) and/or the aircraft aft wheel well bulkhead 154 (see FIG. 8), results in a number of substantial benefits. Disclosed embodiments of the composite hat stiffener 32 (see FIGS. 2A-5B), the composite hat-stiffened pressure web 30, and method 200 (see FIG. 9) provide a unique design that uses a pre-cured composite hat stiffener 33 (see FIG. 6A), comprised of a composite tape composite hat section 38 with a plurality of composite stiffening plies 72 made of composite woven fabric plies applied on all three charges at the charge interface of the composite hat section 38, where the pre-cured composite hat stiffener 33 is bonded or co-bonded to an uncured composite pressure web 140 (see FIG. 6A) such as made of composite tape. Further, disclosed embodiments of the composite hat stiffener 32 (see FIGS. 2A-5B), the composite hat-stiffened pressure web 30, and method 200 (see FIG. 9) provide a design that improves stability, strength, and buckling resistance of the uncured composite pressure web 140, such as in the form of an aircraft horizontal pressure deck pressure web 142 and an aircraft wheel well bulkhead pressure web 152. Such design provides improved stability for the uncured composite pressure web 140, as compared to an existing or known composite I-stiffened pressure web (not shown), and minimizes a pull-off load at the radius filler noodle of existing composite I-stiffener beams or panels, thus eliminating the need for radius filler elements, fasteners, or angle fittings typically used to prevent a failure and to accommodate pull-off loading concerns. Moreover, disclosed embodiments of the composite hat stiffener 32 (see FIGS. 2A-5B) and the composite hat-stiffened pressure web 30 have a different critical detail for pull-off load, thus improving their ability to handle pull-off induced loads. Because disclosed embodiments of the composite hat stiffener 32 (see FIGS. 2A-5B), the composite hat-stiffened pressure web 30, and method 200 (see FIG. 9) may minimize a pull-off load at the radius filler noodle, such as at the pair of radius filler noodles 108, which may result in eliminating or minimizing use of one or more radius filler elements, fasteners, or angle fittings to react the pull-off load, this may result in increased cost savings due to the elimination or minimization of the cost of using such radius filler elements, fasteners, or angle fittings and the elimination or minimization of labor and manufacturing costs to install and maintain such radius filler elements, fasteners, or angle fittings.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of making a composite hat stiffener, the method comprising the steps of:
   adding a composite hat stiffener slot opening to the composite hat stiffener;
   curing the composite hat stiffener in a hat tool to form a pre-cured composite hat stiffener, the pre-cured composite hat stiffener comprising:
   a composite hat section;
   a plurality of composite stiffening plies comprising a body ply, a wrap ply, and a base ply, all coupled to the composite hat section, wherein the body ply is coupled to a first side of the composite hat section, the wrap ply is coupled to the body ply, and the base ply is coupled to the body ply and the wrap ply;
   a vacant composite hat stiffener slot opening positioned at a base portion of the composite hat stiffener and formed by alignment of a wrap ply slot opening and a base ply slot opening;
   a pair of radius filler noodles coupled to the composite hat section and disposed between the plurality of composite stiffening plies; and,
   an outer ply coupled to the composite hat section; and,
   bonding the pre-cured composite hat stiffener to a structure surface.

2. The method of claim 1 further comprising prior to the step of curing the composite hat stiffener, the step of coupling a peel ply to the composite hat stiffener, and after the step of curing, the step of removing the peel ply from the composite hat stiffener.

3. The method of claim 1 further comprising after the step of curing, optionally the step of enlarging the composite hat stiffener slot opening.

4. The method of claim 1 further comprising prior to the step of curing the composite hat stiffener, the step of chamfering edges of a pair of flanges of the composite hat stiffener.

5. The method of claim 1 wherein the step of bonding further comprises the step of bonding the pre-cured composite hat stiffener to an aircraft wheel well bulkhead pressure web.

6. The method of claim 1 further comprising prior to the step of curing the composite hat stiffener, the step of controlling a variable tool radius and a variable noodle radius, and wherein the step of bonding further comprises bonding the pre-cured composite hat stiffener to an aircraft horizontal pressure deck pressure web.

7. The method of claim 1 wherein the step of curing the composite hat stiffener to form the pre-cured composite hat stiffener further comprises curing the composite hat stiffener to form the pre-cured composite hat stiffener comprising:
a cap;
a pair of webs extending from opposite ends of the cap,
a pair of flanges; and,
a pair of fillet radii coupling the pair of flanges to the pair of webs, respectively.

8. The method of claim 1 wherein the step of curing the composite hat stiffener to form the pre-cured composite hat stiffener further comprises forming the composite hat section comprising a plurality of hat section composite plies comprised of a carbon fiber reinforced plastic (CFRP) tape.

9. The method of claim 1 wherein the step of curing the composite hat stiffener to form the pre-cured composite hat stiffener further comprises forming the composite hat section comprising a plurality of hat section composite plies comprised of a carbon fiber reinforced plastic (CFRP) fabric.

10. The method of claim 1 wherein the step of curing the composite hat stiffener to form the pre-cured composite hat stiffener further comprises forming the outer ply comprising a glass material.

11. The method of claim 1 wherein the step of curing the composite hat stiffener to form the pre-cured composite hat stiffener further comprises forming the outer ply comprising a galvanic corrosion protection material and a drill breakout protection material.

12. A method of making a composite hat stiffener, the method comprising the steps of:
curing a composite hat stiffener in a hat tool to form a pre-cured composite hat stiffener, the pre-cured composite hat stiffener comprising:
a composite hat section having a first side and a second side;
a plurality of composite stiffening plies coupled to the composite hat section, the plurality of composite stiffening plies comprising:
a body ply coupled to the first side of the composite hat section;
a wrap ply coupled to the body ply, the wrap ply having a wrap ply slot opening formed in a base portion of the wrap ply; and,
a base ply coupled to the body ply and the wrap ply, the base ply having a base ply slot opening;
a vacant composite hat stiffener slot opening positioned at a base portion of the composite hat stiffener and formed by alignment of the wrap ply slot opening and the base ply slot opening;
a pair of radius filler noodles coupled to the composite hat section and disposed between the plurality of composite stiffening plies; and,
an outer ply coupled to the second side of the composite hat section, the outer ply comprising a glass material and a galvanic corrosion protection material;
bonding the pre-cured composite hat stiffener to a structure surface.

13. The method of claim 12 further comprising prior to the step of curing the composite hat stiffener, the step of coupling a peel ply to the composite hat stiffener, and after the step of curing, the step of removing the peel ply from the composite hat stiffener.

14. The method of claim 12 further comprising prior to the step of curing the composite hat stiffener, the step of chamfering edges of a pair of flanges of the composite hat stiffener.

15. The method of claim 12 wherein the step of bonding further comprises the step of bonding the pre-cured composite hat stiffener to an aircraft wheel well bulkhead pressure web.

16. The method of claim 12 wherein the step of curing the composite hat stiffener to form the pre-cured composite hat stiffener further comprises curing the composite hat stiffener to form the pre-cured composite hat stiffener comprising:
a cap;
a pair of webs extending from opposite ends of the cap,
a pair of flanges; and,
a pair of fillet radii coupling the pair of flanges to the pair of webs, respectively.

17. A method of making a composite hat-stiffened pressure web to reduce effects of a pull-off load and to improve stability of a pressure web, the method comprising the steps of:
adding a composite hat stiffener slot opening to the composite hat stiffener;
curing the composite hat stiffener in a hat tool to form a pre-cured composite hat stiffener, the pre-cured composite hat stiffener comprising:
a composite hat section;
a plurality of composite stiffening plies comprising a body ply, a wrap ply, and a base ply, all coupled to the composite hat section;
a vacant composite hat stiffener slot opening positioned at a base portion of the composite hat stiffener and formed by alignment of a wrap ply slot opening and a base ply slot opening;
a pair of radius filler noodles coupled to the composite hat section and disposed between the plurality of composite stiffening plies; and,
an outer ply coupled to the composite hat section; and,
bonding the pre-cured composite hat stiffener to an uncured composite pressure web to form a composite hat-stiffened pressure web,
wherein the composite hat-stiffened pressure web minimizes a pull-off load at the radius filler noodle and improves stability of a pressure web.

18. The method of claim 17 further comprising prior to the step of curing the composite hat stiffener, the step of coupling a peel ply to the composite hat stiffener, and after the step of curing, the step of removing the peel ply from the composite hat stiffener.

19. The method of claim 17 further comprising after the step of curing optionally the step of enlarging the composite hat stiffener slot opening.

20. The method of claim 17 further comprising prior to the step of curing the composite hat stiffener, the step of chamfering edges of a pair of flanges of the composite hat stiffener.

* * * * *